«12» United States Patent
Robins

(10) Patent No.: US 7,581,749 B2
(45) Date of Patent: Sep. 1, 2009

(54) INTEGRATED AIRBAG PANEL

(75) Inventor: Erik B. Robins, Milford, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/871,491

(22) Filed: Oct. 12, 2007

(65) Prior Publication Data

US 2009/0096193 A1    Apr. 16, 2009

(51) Int. Cl.
*B60R 21/16* (2006.01)
(52) U.S. Cl. .................................... 280/728.2
(58) Field of Classification Search ............... 280/728.2, 280/728.3, 730.2
See application file for complete search history.

(56) References Cited

U.S. PATENT DOCUMENTS

| | | | |
|---|---|---|---|
| 5,454,589 A | 10/1995 | Bosio et al. | |
| 5,752,717 A | 5/1998 | Galbraith et al. | |
| 5,839,756 A | 11/1998 | Schenck et al. | |
| 6,170,871 B1 | 1/2001 | Goestenkors et al. | |
| 6,296,269 B1 * | 10/2001 | Nagai et al. | 280/728.2 |
| 6,338,501 B1 | 1/2002 | Heilig et al. | |
| 6,431,583 B1 * | 8/2002 | Schneider | 280/728.2 |
| 6,431,584 B1 * | 8/2002 | Nagasawa et al. | 280/728.2 |
| 7,048,298 B2 | 5/2006 | Arwood et al. | |
| 7,108,316 B2 | 9/2006 | Barvosa-Carter et al. | |
| 7,125,045 B2 | 10/2006 | Fuks et al. | |
| 2002/0190548 A1 | 12/2002 | Ruel et al. | |
| 2003/0030253 A1 * | 2/2003 | Galmiche et al. | 280/728.2 |
| 2004/0251665 A1 | 12/2004 | Kumagai | |

FOREIGN PATENT DOCUMENTS

WO        2004065180 A1     8/2004

* cited by examiner

*Primary Examiner*—Faye M. Fleming
(74) *Attorney, Agent, or Firm*—Young Basile

(57) ABSTRACT

A moveable integrated airbag panel and method of assembly is presented. In the exemplary application, a vehicular expandable airbag is attached to the inside of an A-pillar trim panel along with the inflator to form an integrated airbag panel that is attached as a preassembled unit to the vehicle body structure. On deployment of the airbag, the integrated airbag panel as a unit moves away from the A-pillar structure while a portion of the airbag remains attached to the A-pillar structure to limit movement of the airbag. The moveable integrated airbag panel provides increased coverage and protection of the occupant in the A-pillar area.

20 Claims, 5 Drawing Sheets

INTEGRATED AIRBAG PANEL

FIELD OF INVENTION

This invention generally pertains to the field of supplemental restraint systems for passenger vehicles and more particularly to safety airbags.

BACKGROUND

Protective airbag restraints for use in passenger automobile applications have become standard equipment on almost all new vehicles sold in the United States and are common equipment on vehicles manufactured and sold throughout the world. In recent years, side or frontal airbags have been employed to further protect occupants in frontal and side vehicular impact events.

An important and difficult area to protect is the area of the A-pillar vehicle body structure which is the narrow sheet metal body structure positioned between the front door window glass and the windshield. In vehicular frontal or angular impacts, it is advantageous for occupant safety to provide a cushion or airbag to reduce hard impact of an occupant with this rigid body structure.

Early airbags positioned in the door or instrument panel areas were rigidly attached to the sheet metal body structure and were deployed either through intentional thin areas or seams molded into the trim panels, or the panels were provided with hinge-like attachments where on inflation of the airbag, the trim panel or portions thereof pivoted out of the way of the expanding airbag. This required special features to be molded into the trim panels and additional assembly steps as the airbag system needed to first be installed to the sheet metal on the vehicle main assembly line, then carefully covered by an interior trim panel to conceal the airbag and provide an aesthetically pleasing surface for the occupant.

These efforts were only partially successful and added much complexity to the design, manufacture and assembly of the airbag system in the vehicle. These prior airbag systems, particularly in the A-pillar area also suffered disadvantages in completely covering or providing a cushioning surface all along the A-pillar, most particularly in the lower portion of the A-pillar where the trim panel meets the door or instrument panel. This area is particularly difficult to protect smaller occupants, for example individuals in the lower 5 percent of the general population in size.

It would be advantageous to provide an airbag apparatus and method of manufacture that improved on these deficiencies of prior airbag systems. It would be further advantageous to provide an airbag system that was integrated with the trim panel for ease of manufacturing and assembly and that provided additional coverage and protection of the occupant.

SUMMARY OF THE INVENTION

The present invention provides an integrated airbag panel and a method of assembly therefore. In one example of the invention, a moveable integrated airbag panel is provided. The moveable integrated airbag panel includes an interior A-pillar trim panel with the airbag and the inflator mounted to an interior surface of the trim panel forming an integrated airbag panel, that, as a unit, is releaseably attached to the sheet metal support structure.

In one example, the airbag and trim panel are attached to the support structure through a first fastener having a frangible portion. On inflation of the airbag, the frangible portion fractures and the integrated airbag panel, as a unit, is forced away from the vehicle sheet metal body structure providing a contact or cushioning surface substantially the entire length of the A-pillar.

In an alternate example, the first fastener includes a body portion and a clip portion. On inflation of the airbag, the base portion mechanically separates from the clip portion allowing the body portion and the integrated airbag panel to move away from the pillar support structure while the clip portion remains attached to the pillar structure maintaining attachment of the airbag to the pillar structure. In this example, the clip and the airbag serve as a tether to limit movement of the trim panel from the pillar structure.

In an alternate example, the airbag is connected at additional points to the interior surface of the moveable trim panel in a substantially permanent way by second fasteners to ensure the airbag remains integrated or connected to the trim panel as the trim panel moves away from the body structure on expansion of the airbag.

In another example of the invention, one or more mounting bases are integrally molded into the trim panel to facilitate attachment of the airbag to the trim panel.

The method of assembly includes providing a moveable panel and mounting the airbag and inflator to the moveable panel forming an integrated airbag panel. The integrated panel is attached to the vehicle body structure by a first fastener which permits the airbag to expand allowing the integrated airbag panel to move away from the body structure and provide a cushioning surface.

DESCRIPTION OF THE DRAWING

The description herein makes reference to the accompanying drawings wherein like reference numerals refer to like parts throughout the several views, and wherein.

DETAILED DESCRIPTION OF THE PREFERRED EMBODIMENT

Figure 1:
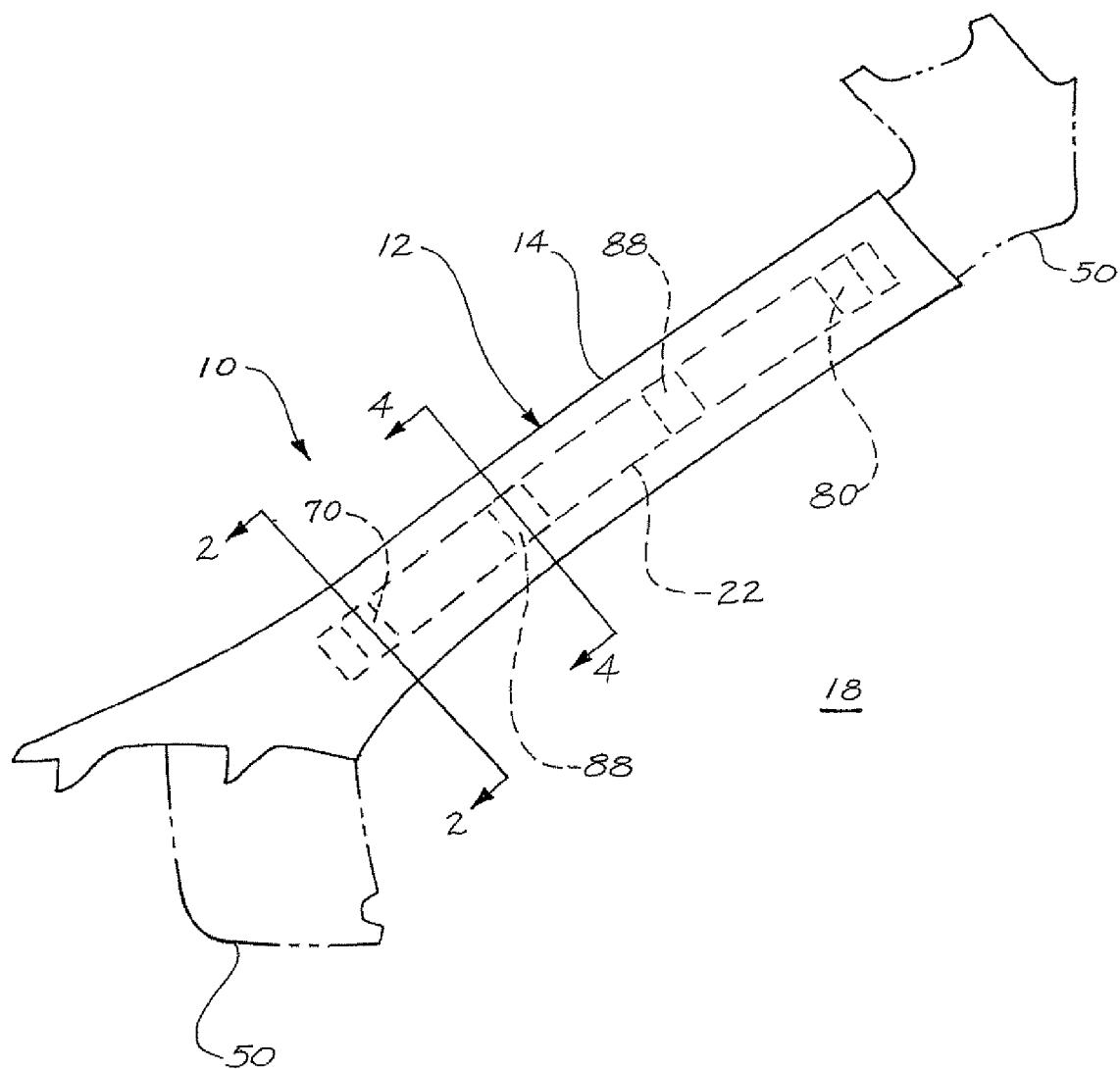
FIG. 1 is a schematic perspective view of an example of the integrated airbag panel in the form of a passenger vehicle A-pillar trim panel.
Figure 2:
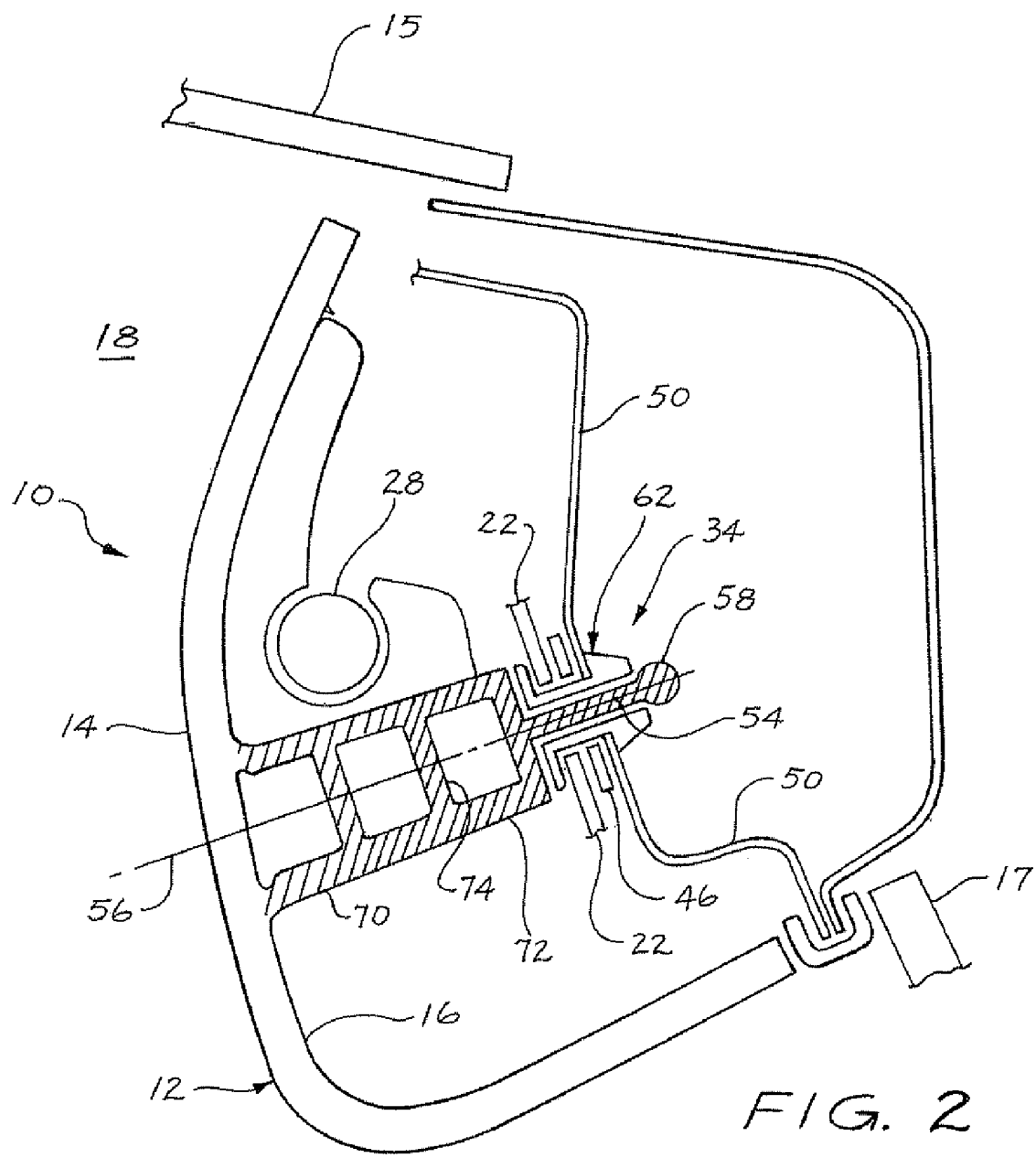
FIG. 2 is an enlarged cross-sectional view taken along line 2-2 in FIG. 1 showing an airbag in an uninflated state.

An integrated airbag panel and method of assembly is shown in FIGS. 1-6. Referring to FIGS. 1 and 2, in an exemplary application in the A-pillar portion of a passenger vehicle, an integrated airbag panel 10 includes an interior A-pillar trim panel 12 typically positioned between the windshield 15 and door 17 of a passenger vehicle. Trim panel 12 includes an outer surface 14 positioned facing the interior of a passenger compartment 18 and an interior surface 16 positioned facing the exterior of a vehicle. Trim panel 12 may be an injection molded panel made from polyethylene, polypropylene or other polymers, elastomers, rubbers or other materials, produced by different manufacturing processes, known by those skilled in the art.

Figure 5:
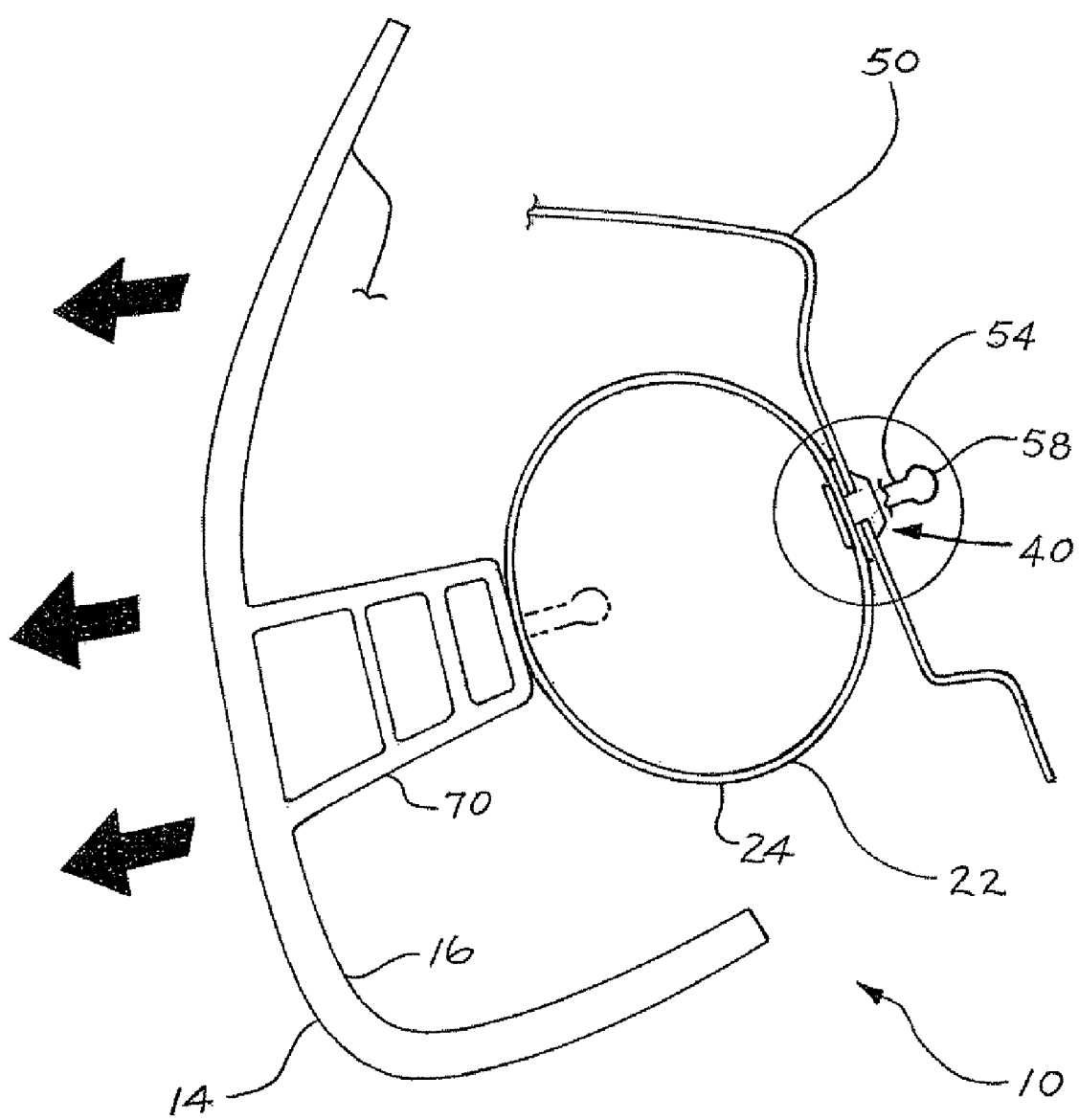
FIG. 5 is an enlarged cross-sectional view taken along line 2-2 in FIG. 1 showing an example of the airbag in an inflated state.
Figure 5A:
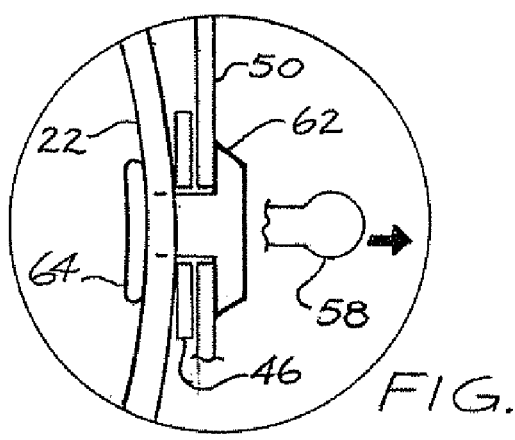
FIG. 5A is an enlarged portion of FIG. 5.

Integrated airbag panel 10 further includes an inflatable airbag 22 which may include a two-layer fabric airbag that is sewn together about a perimeter to form an interior air or gaseous chamber 24 as best seen in FIG. 5. Airbag 22 is preferably mounted to the inner surface 16 of trim panel 12 as generally shown in FIGS. 1 and 2 as more fully described below. Integrated airbag panel 10 further includes an inflator 28 preferably mounted to the inner surface 16 in proximity to airbag 22 as best seen in FIG. 2. Airbag 22 is placed in fluid communication with inflator 28 such that on a signal from a controller (not shown) to inflate airbag 22, compressed air or gas inside of inflator 28 is rapidly forced into airbag 22 to inflate the airbag and provide a cushion between an occupant and the vehicle body structure more filly described below. It is understood that airbag 22 can be a one-piece construction and take different lengths, widths, diameters and shapes than as shown and as known by those skilled in the art. It is further understood that inflator 28 may take many forms to accommodate the particular method used to inflate airbag 22 known by those skilled in the art.

Figure 3:
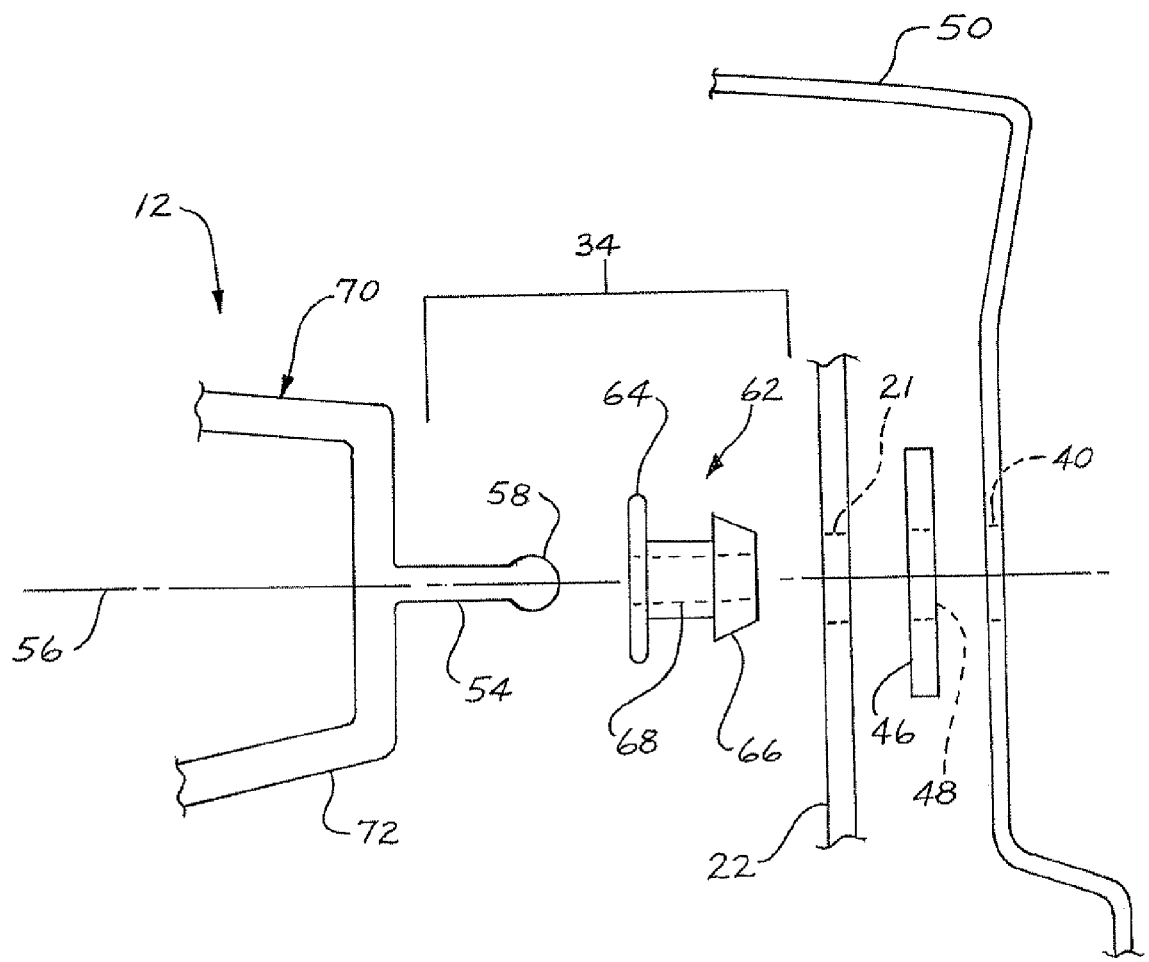
FIG. 3 is an enlarged exploded view of the components depicted in FIG. 2.

As best seen in FIGS. 2 and 3, in an example of the integrated airbag panel 10, airbag 22 is mounted to the inner surface 16 of trim panel 12 through use of at least one first fastener 34. First fastener 34 includes a body portion 54 and an enlarged end 58 positioned axially distant from panel inner surface 16 generally along a longitudinal axis 56. In a preferred example, body portion 54 is integrally molded into trim panel 12 not requiring a separate mechanical fastener directly attached to trim panel 12. First fastener 34 may further include an annular clip portion 62 having a first end 64 and an enlarged second end 66. Clip 62 includes a through-bore 68 which is slightly smaller in diameter than enlarged end 58 so that clip 62 may be inserted over body portion 54 and end 58 in an interference-type fit without overly stressing body portion 54 on installation of clip 62. It is understood that clip portion 62, shown as a separate piece, may be integral with body portion 54.

In a preferred example of first fastener 34, body portion 54 includes an elongate frangible portion between the mounting base 70 and enlarged end 58. As more fully described below, when airbag 22 expands, the frangible portion fractures allowing trim panel 12 to move away from support structure 50.

In one example, trim panel 12 may include a first mounting base 70 integrally molded into the inner surface 16 of trim panel 12 including a distal end 72 defining a generally planar surface as best seen in FIG. 3. First mounting base 70 projects axially outward along longitudinal axis 56 from inner surface 16 and may include reinforcement ribs 74. In a preferred example, a second mounting base 80 may be positioned distant from first mounting base 70 as best seen in FIG. 1 and may be similarly constructed (not shown).

An aperture 21 though the airbag 22 may be used for insertion of body portion 54 through the aperture for attachment of airbag 22 to trim panel 12. Aperture 21 is sized smaller than the enlarged second end 66 of clip 62 and enlarged end 58 of frangible portion 54 while still allowing insertion of airbag 22 over them. A washer 46 having a through-bore 48 is similarly placed over enlarged end 58 of frangible portion 54 and enlarged end 66 of clip 62 to further secure airbag 22 to trim panel 12 as best seen in FIG. 2. It is understood that other attachments other than integral body portion 54 and washer 46 may be used. For example, instead of body portion 54 being integrally molded into trim panel 12, a separate mechanical fastener such as a plastic clip having a similar shape as clip 62 may be secured to the interior surface 16 of trim panel 12. This may be accomplished by many means known by those skilled in the art, for example, through use of mounting pads 88 shown in FIG. 4 and more fully described below. The fastener or clip first end, for example 64 on clip 62, would be secured to inner surface 16 and second enlarged end 66 would be positioned through aperture 40 in structure 50 as more fully described below. Other ways of using a first fastener 34 known by those skilled in the art may be used without deviating from the present invention.

Figure 4:
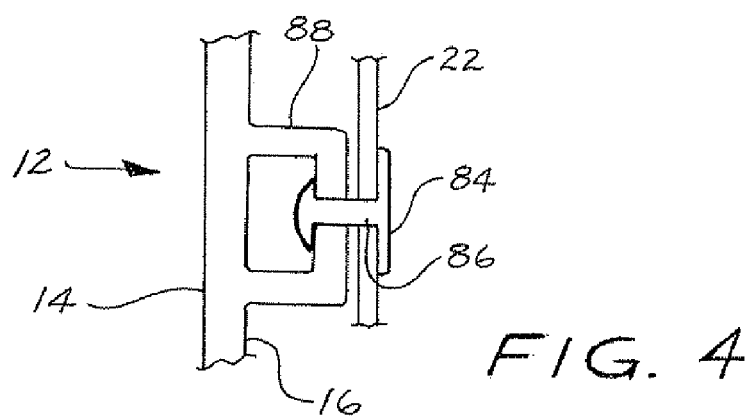
FIG. 4 is an enlarged cross-sectional view taken along line 4-4 in FIG. 1.
Figure 6:
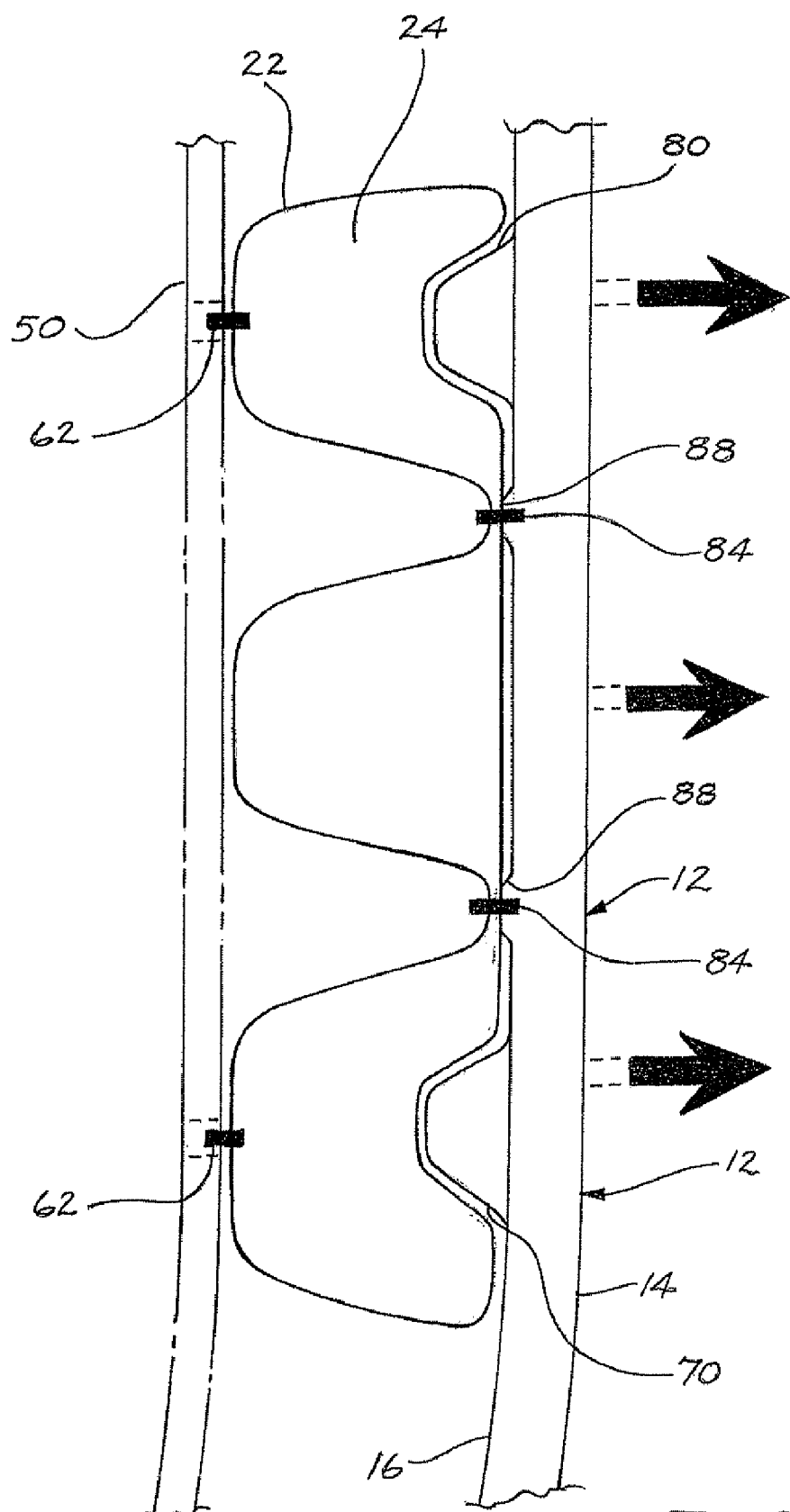
FIG. 6 is a schematic rear view of the left hand side of a vehicle A-pillar and an exemplary integrated airbag panel with the airbag in an inflating state.

Referring to FIG. 4, in an example, airbag 22 may be further secured to trim panel 12 at one or more locations. As best seen in FIGS. 1, 4 and 6, trim panel 12 may include one or more mounting pads 88 (two shown). Mounting pads 88 are preferably integrally molded into inner surface 16. A second fastener 84 is inserted through a second airbag aperture 86 and rigidly secured to mounting pad 88. In a preferred example, second fastener 84 is a permanent mechanical attachment device so that airbag 22 does not separate from trim panel 12 during deployment of airbag 22 as further described below. Second fastener 84 may be robust plastic or aluminum clip or rivet and may include additional mechanical fasteners such as a washer (not shown) or other features known by those skilled in the art.

On securing airbag 22 and inflator 28 to trim panel 12 as described above, and in other ways known by those skilled in the art, a moveable integrated airbag panel 10 is formed. The integrated airbag panel 10 may be completely assembled off of the vehicle assembly line or at an independent off-site supplier and shipped as a complete one-piece unit into a vehicle assembly plant. The integrated airbag panel 10 is then simply attached to the vehicle body structure as more fully described below. Once the integrated airbag panel 10 is in the vehicle assembly plant, the inflator 28 would be fluidly connected to the airbag 22 and the inflator 28 would be connected to a controller through wires (not shown) at the time the integrated airbag panel 10 is installed in the vehicle.

Integrated airbag panel 10 following assembly into a complete unit as described, is releaseably attached to vehicle body sheet metal structure 50, preferably in the A-pillar region of a passenger vehicle. As best seen in FIGS. 2-4, in a preferred example, airbag panel 10 is oriented such that at least one first fastener 34 is positioned adjacent body structure sheet metal 50 in substantial axial alignment along longitudinal axis 56 and placed in alignment with aperture 40 in structure 50. First fastener 34 and more particularly a body portion 54 and enlarged end 58, along with clip second end 66 are forceably pushed through aperture 40 until end 66 is pushed through in axial locking engagement on the other side of the sheet metal structure 50 as best seen in FIG. 2. Although one first fastener 34 may be used to attach airbag panel 10 to support structure 50, two similarly constructed first fasteners 34 are preferably used (as shown in FIG. 1). Additional fasteners may be used for larger panels. Once integrated airbag panel 10 is installed and properly connected to a controller to monitor impact events, the integrated airbag panel 10 is ready for use to shield and protect occupants.

Figure 3A:
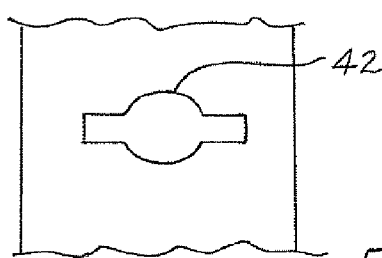
FIG. 3A is a front view of an exemplary aperture in the A-pillar sheet metal.

In a preferred example, once clip 62 is pushed through structure 50 aperture 40, clip 62, and integrated airbag panel 10 is locked to structure 50 along axis 56 and cannot be axially removed without destroying first fastener clip 62. In an alternate example shown in FIG. 3A, an alternate aperture 42 is used. In this example, an alternate clip 62 (not shown) is configured to cooperate with aperture 42 so that clip 62 is normally locked from axial movement but may be manipulated, for example turning 90 degrees about axis 56 to unlock and remove the clip without damaging the clip. This would be useful following deployment of airbag 22 or for simple maintenance of integrated airbag panel 10 or surrounding components. Similar alternate apertures 42 and coordinating removable fasteners, for example where a separate mechanical fastener is used for first fastener body portion 54 and attachment to mounting base 70, may be used.

In exemplary operation, on signal from a controller (not shown) of an impact event warranting deployment of airbag 22, inflator 28 is activated to inflate airbag 22. As best seen in FIGS. 5 and 6, during inflation of airbag 22, gaseous interior chamber 24 will begin to rapidly expand. During the rapid expansion, first fastener body portion 54 is placed under extreme tensile stress along longitudinal axis 56. Airbag panel 10 having only connection to structure 50 through first fasteners 34 and being the weakest link in the connection of airbag panel 10 to structure 50, fastener 34 quickly fractures under stress of the expanding airbag 22. The fracture of body portion 54 preferably allows free movement of the integrated airbag panel 10, as a unit, away from structure 50 as the airbag expands. In an alternate example, body portion 54 does not fracture, but enlarged end 58 is pulled back through bore 68 along axis 56 thus mechanically separating body portion 54 and clip portion 62 of first fastener 34 (shown in FIG. 5 in phantom).

Referring to FIG. 5, in a preferred example, whether first fastener 34 fractures or mechanically separates as described above, clip portion 62, and airbag 22 remains connected to structure 50 as best seen in FIGS. 5 and 6. In this example, clip portion 62 and airbag 22, being connected to structure 50 and trim panel 12, acts as a tether limiting movement of trim panel 12 away from structure 50 It is understood that other devices (not shown) may serve as tethers, for example, separate straps connected to trim panel 12 and structure 50 known by those skilled in the art may be used In a preferred example shown in FIG. 6, airbag 22 forcefully presses against structure 50, thrusting integrated airbag panel 10 away from structure 50, preferably A-pillar body structure, toward the interior compartment 18 and preferably in a direction toward a passenger to further prevent the passenger from striking the rigid body structure 50. By the entire integrated airbag panel 10 moving as a unit away from the A-pillar structure 50, a greater area of protection, substantially the entire length of the vehicle A-pillar, is achieved which is advantageous over prior designs. The movement of the integrated airbag panel 10 further removes the difficulties and complexities experienced in prior designs in which the airbag expanded through the fracture or disintegration of the trim panel itself, or the trim panel being hinged out of the way, but remained at least partially attached to the vehicle structure through direct connection or tether straps.

In an alternate example (not shown), airbag 22 may be configured to provide a larger volume in interior chamber 24 at an upper portion, higher on the A-pillar, and a lesser volume near the lower portion of the A-pillar to provide increased cushioning for an occupant's head. Alternately, different areas of airbag 22 may have increased or decreased volume or thickness to suit the particular application and cushioning requirements.

In a preferred method of assembly, a moveable integrated airbag panel 10 is assembled as described above and as best shown in FIGS. 1-4. The integrated airbag panel 10 is attached to the vehicle body structure 50 in the manner described above and best shown in FIGS. 2 and 3.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An integrated airbag apparatus for use in passenger vehicles having an interior compartment, the apparatus comprising:
   a moveable pillar trim panel having an inner surface, an outer surface and at least one releasable first fastener;
   an airbag inflator mounted to the panel adjacent to the inner surface;
   a selectively inflatable airbag mounted to the trim panel adjacent the inner surface in fluid communication with the inflator forming a moveable integrated airbag panel for attachment to a support structure by the first fastener through engagement with a portion of the airbag, wherein on inflation of the airbag the integrated panel moves relative to the support structure to absorb energy on impact of an object with the panel outer surface.

2. The apparatus of claim 1 wherein the first fastener is integral with the trim panel.

3. The apparatus of claim 1 wherein the first fastener comprises a body portion connected to the trim panel and a clip connected to the body portion and the support structure.

4. An integrated airbag apparatus for use in passenger vehicles having an interior compartment, the apparatus comprising:
   a moveable pillar trim panel having an inner surface, an outer surface and at least one releasable first fastener, the first fastener having a body portion connected to the trim panel and a clip connected to the body portion and a support structure, at least one of the body portion and the clip includes a frangible portion,
   an airbag inflator mounted to the panel adjacent to the inner surface;
   a selectively inflatable airbag mounted to the trim panel adjacent the inner surface in fluid communication with the inflator forming a moveable integrated airbag panel for attachment to the support structure by the first fastener, wherein on inflation of the airbag the frangible portion fractures allowing expansion of the airbag thrusting the integrated airbag panel relative to and away from the support structure to absorb energy on impact of an object with the panel outer surface.

5. The apparatus of claim 4 wherein the frangible portion includes an elongated portion having an enlarged end axially distant from the panel inner surface.

6. The apparatus of claim 3 wherein the body portion is releasably connected to the clip, wherein on inflation of the airbag, the body portion separates from the clip allowing expansion of the airbag thrusting the integrated airbag panel away from the support structure.

7. The apparatus of claim 1 wherein the trim panel further comprises at least one mounting base connected to and extending outwardly from the inner surface, the mounting base operably engaging the first fastener.

8. An integrated airbag apparatus for use in passenger vehicles having an interior compartment, the apparatus comprising:
   a moveable pillar trim panel having an inner surface, an outer surface and at least one releasable first fastener, the first fastener having a body portion connected to the trim panel and a clip connected to the body portion and a support structure;

an airbag inflator mounted to the panel adjacent to the inner surface;

a selectively inflatable airbag mounted to the trim panel adjacent the inner surface in fluid communication with the inflator forming a moveable integrated airbag panel for attachment to the support structure by the first fastener, wherein on inflation of the airbag the integrated panel moves relative to the support structure and the airbag remains connected to the support structure serving as a tether for the integrated airbag panel to the support structure to absorb energy on impact of an object with the panel outer surface.

9. The apparatus of claim 1 wherein the moveable panel is a vehicular interior A-pillar trim panel.

10. A vehicular airbag system for use in passenger vehicles having an interior passenger compartment, the system comprising:

a rigid pillar support structure;

a moveable pillar trim panel having an inner surface, an outer surface, at least one mounting base extending axially outward from the inner surface and a first fastener connected to the mounting base, the first fastener including an elongate body portion connected to the mounting base and a clip portion;

an airbag inflator rigidly mounted to the inner surface of the panel;

a selectively inflatable airbag in fluid communication with the inflator and mounted to the trim panel by a second fastener to form a moveable integrated airbag panel, the integrated panel is releaseably attached to the pillar structure by the first fastener clip portion, wherein on inflation of the airbag, the first fastener body portion separates from the clip portion allowing the trim panel to move away from the pillar structure and the airbag remaining connected to the pillar structure by the clip portion limiting movement of the integrated panel relative to the pillar structure.

11. The airbag system of claim 10 wherein the first fastener is integral with the trim panel.

12. A vehicular airbag system for use in passenger vehicles having an interior passenger compartment, the system comprising:

a rigid pillar support structure;

a moveable pillar trim panel having an inner surface, an outer surface, at least one mounting base extending axially outward from the inner surface and a first fastener connected to the mounting base, the first fastener including an elongate body portion connected to the mounting base, a clip portion and a frangible portion;

an airbag inflator rigidly mounted to the inner surface of the panel; and a selectively inflatable airbag in fluid communication with the inflator and mounted to the trim panel by a second fastener to form a moveable integrated airbag panel, the integrated panel is releaseably attached to the pillar structure by the first fastener clip portion, wherein on inflation of the airbag, the frangible portion fractures and first fastener body portion separates from the clip portion allowing the trim panel to move away from the pillar structure and the airbag remaining connected to the pillar structure by the clip portion limiting movement of the integrated panel relative to the pillar structure.

13. The airbag system of claim 12 wherein the frangible portion is positioned in an area on the elongate base portion of the first fastener.

14. A vehicular airbag system for use in passenger vehicles having an interior passenger compartment, the system comprising:

a rigid pillar support structure;

a moveable pillar trim panel having an inner surface, an outer surface, at least one mounting base extending axially outward from the inner surface and a first fastener connected to the mounting base, the first fastener including an elongate body portion connected to the mounting base and a clip portion;

an airbag inflator rigidly mounted to the inner surface of the panel; and a selectively inflatable airbag in fluid communication with the inflator, the airbag is conical in shape having a larger volume in an area adjacent an upper portion of the pillar trim panel and smaller volume adjacent a lower portion of the trim panel, the airbag is mounted to the trim panel by a second fastener to form a moveable integrated airbag panel, the integrated panel is releaseably attached to the pillar structure by the first fastener clip portion, wherein on inflation of the airbag, the first fastener body portion separates from the clip portion allowing the trim panel to move away from the pillar structure and the airbag remaining connected to the pillar structure by the clip portion limiting movement of the integrated panel relative to the pillar structure.

15. A method for assembling a movable airbag panel for use in passenger vehicles having an interior compartment, the method comprising:

providing a movable pillar trim panel having an inner surface and an outer surface;

mounting an airbag inflator to the inner surface of the moveable panel;

mounting an inflatable airbag to the inner surface of the moveable panel in fluid communication with the inflator forming a moveable integrated airbag panel;

releaseably mounting the moveable integrated airbag panel to a pillar support structure such that on inflation of the airbag, the integrated airbag panel as a unit is thrust away from the pillar structure to serve as a cushioning surface.

16. The method of claim 15 wherein mounting the integrated airbag panel to the pillar structure further comprises the step of providing at least one first fastener having a body portion connected to the moveable panel and a clip portion connected to the pillar structure, the first fastener engaging a portion of the airbag, wherein on expansion of the airbag the body portion separates from the clip portion allowing the integrated airbag panel to move away from the pillar structure.

17. The method of claim 16 wherein providing the step of releaseably mounting the integrated panel to the pillar structure further comprises, attaching the airbag to the pillar structure such that the airbag remains attached to the pillar structure during inflation of the airbag.

18. A method for assembling a movable airbag panel for use in passenger vehicles having an interior compartment, the method comprising:

providing a movable pillar trim panel having an inner surface and an outer surface;

mounting an airbag inflator to the inner surface of the moveable panel;

mounting an inflatable airbag to the inner surface of the moveable panel in fluid communication with the inflator forming a moveable integrated airbag panel;

releaseably mounting the moveable integrated airbag panel to a pillar support structure through providing at least one first fastener having body portion connected to the moveable panel, a clip portion connected to the pillar structure, and a frangible portion such that on inflation of the airbag, the frangible portion factures allowing at least a part of the body portion to separate from the clip portion allowing the integrated airbag panel as a unit to thrust away from the pillar structure to serve as a cushioning surface.

19. The method of claim 14 wherein the step of providing a moveable panel consists of providing a vehicular interior A-pillar trim panel.

20. The airbag apparatus of claim 1 wherein engagement of the first fastener with the airbag comprises the airbag defining a through aperture and the first fastener positioned through the airbag aperture.

\* \* \* \* \*